(12) United States Patent
Matsuda

(10) Patent No.: US 7,007,065 B2
(45) Date of Patent: Feb. 28, 2006

(54) INFORMATION PROCESSING APPARATUS AND METHOD, AND STORAGE MEDIUM

(75) Inventor: Koichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 909 days.

(21) Appl. No.: 09/837,341

(22) Filed: Apr. 19, 2001

(65) Prior Publication Data

US 2002/0007395 A1    Jan. 17, 2002

(30) Foreign Application Priority Data

Apr. 21, 2000   (JP)   ............... P2000-121694

(51) Int. Cl.
  *G06F 15/16* (2006.01)
  *G06F 3/00* (2006.01)
(52) U.S. Cl. ............ 709/205; 709/206; 715/758
(58) Field of Classification Search ........ 709/227, 709/231, 205, 206, 203; 345/418, 419, 473; 715/758, 757
  See application file for complete search history.

(56) References Cited

U.S. PATENT DOCUMENTS

| | | | | |
|---|---|---|---|---|
| 5,210,689 A | * | 5/1993 | Baker et al. ............. | 704/1 |
| 5,500,919 A | * | 3/1996 | Luther .................... | 704/260 |
| 5,880,731 A | * | 3/1999 | Liles et al. .............. | 715/758 |
| 5,884,029 A | * | 3/1999 | Brush et al. ............. | 709/202 |
| 5,956,038 A | * | 9/1999 | Rekimoto ................ | 345/419 |
| 5,963,217 A | * | 10/1999 | Grayson et al. .......... | 345/473 |
| 5,983,003 A | * | 11/1999 | Lection et al. ........... | 709/202 |
| 6,020,885 A | * | 2/2000 | Honda .................... | 715/757 |
| 6,219,045 B1 | * | 4/2001 | Leahy et al. ............. | 715/757 |
| 6,292,198 B1 | * | 9/2001 | Matsuda et al. .......... | 345/473 |
| 6,345,245 B1 | * | 2/2002 | Sugiyama et al. ........ | 704/10 |
| 6,384,829 B1 | * | 5/2002 | Prevost et al. ........... | 345/473 |
| 6,433,784 B1 | * | 8/2002 | Merrick et al. .......... | 345/473 |
| 6,453,294 B1 | * | 9/2002 | Dutta et al. .............. | 704/270.1 |
| 6,772,195 B1 | * | 8/2004 | Hatlelid et al. .......... | 709/204 |

FOREIGN PATENT DOCUMENTS

GB    2128786 A    *    5/1984

OTHER PUBLICATIONS

Szadkowski, Joseph "NTT Corp. pioneers 3-D interactive environment" Washington Times. Washington, D.C.: Jun. 8, 1998. p. D.8.*

Guly, Christopher "Now Internet chat room fiends can get a virtual life". The Ottawa Citizen. Ottawa, Ont.: Jan 31, 2000. p. A.5.*

(Continued)

*Primary Examiner*—Marc D. Thompson
*Assistant Examiner*—Yemane M. Gerezgiher
(74) *Attorney, Agent, or Firm*—Oblon, Spivak, McClelland, Maier & Neustadt, P.C.

(57) ABSTRACT

An information processing apparatus is disclosed which is connected to a server along with other information processing apparatuses through a network and which is supplied with a shared virtual space. The apparatus comprises an inputting element for allowing a user to input strings of characters constituting a chat carried on via an avatar which is active in the shared virtual space as an incarnation of the user, a transmitting element for transmitting strings of characters input through the inputting element to the server as character data, a converting element for converting the character data coming from the server into audio data, and an outputting element for audibly outputting the audio data converted by the converting element.

3 Claims, 18 Drawing Sheets

OTHER PUBLICATIONS

P.J. Huffstutter "Think Chat Is Flat? Firm Offers 2-D Personal 'Rooms' on Web" Los Angeles Times. Los Angeles, Calif.: Sep. 29, 1997. p. 1.*

U.S. Appl. No. 09/228,135, filed Jan. 11, 1999, Pending.

U.S. Appl. No. 09/084,515, filed May 26, 1998, Allowed.
U.S. Appl. No. 09/081,147, filed May 19, 1998, Allowed.
U.S. Appl. No. 09/837,341, filed Apr. 19, 2001, Pending.
U.S. Appl. No. 10/084,926, filed Mar. 1, 2002, Pending.

* cited by examiner

FIG.10

| | |
|---|---|
| GOOD AFTERNOON | SOUND 1 |
| GOOD EVENING | SOUND 2 |
| . . . | |
| YOO-HOO | SOUND n |

F I G. 14
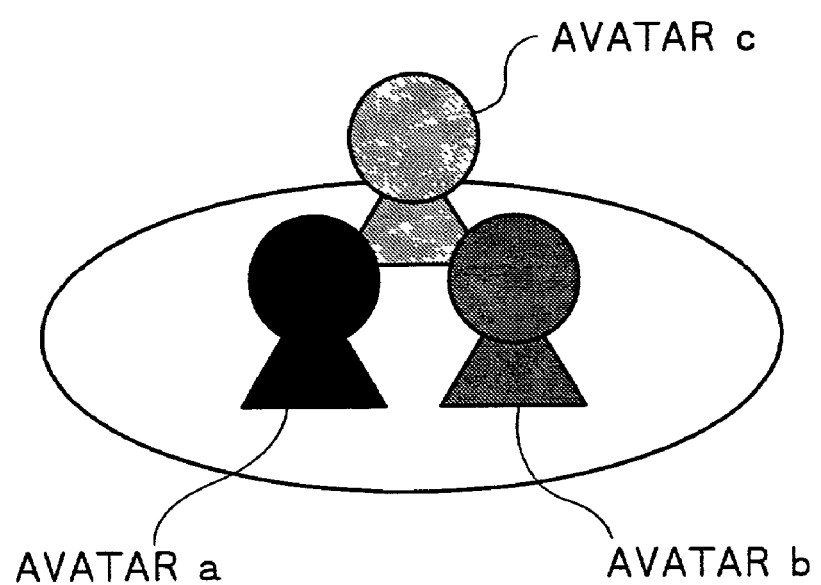

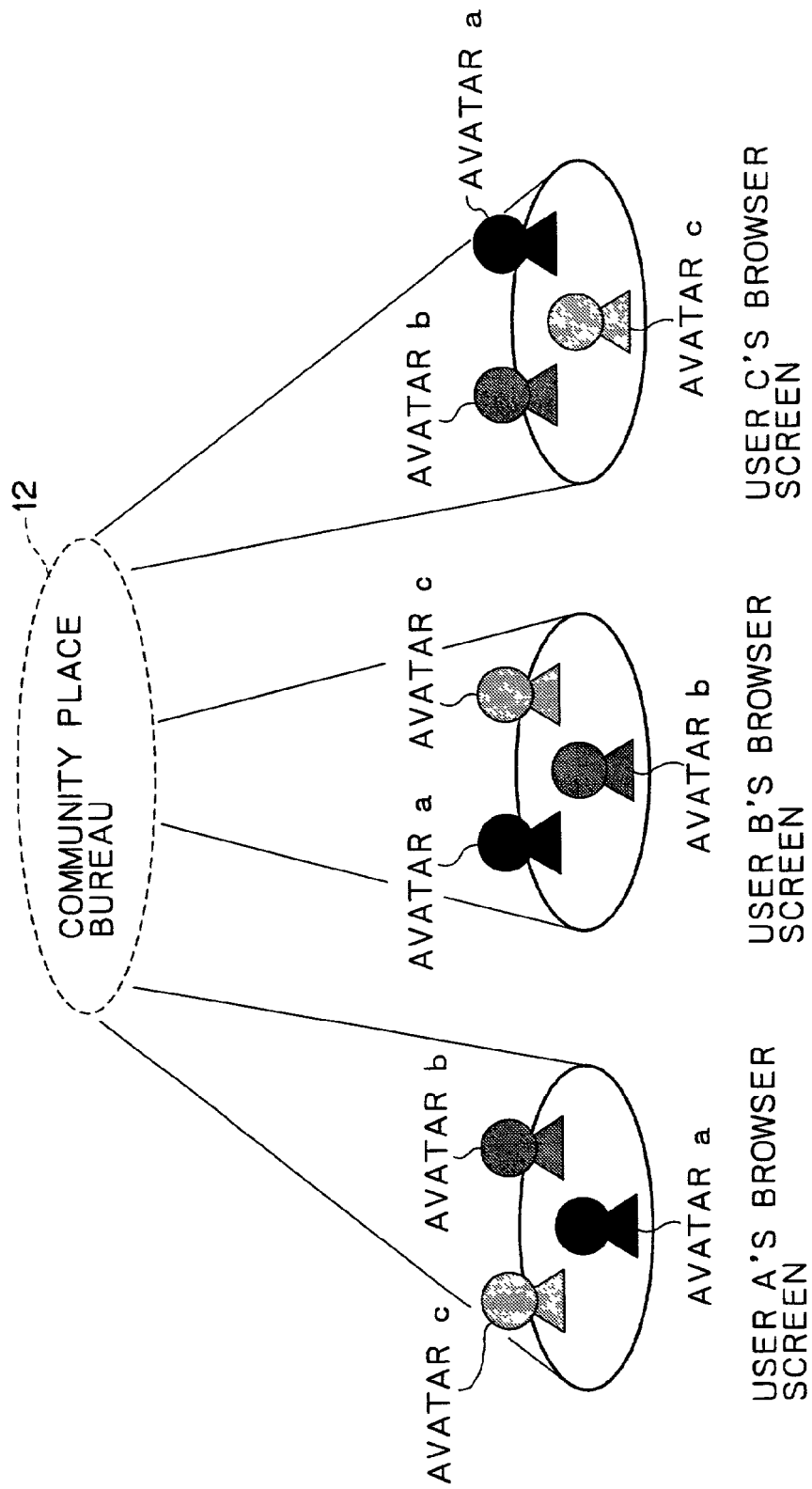
F I G. 15

USER B'S BROWSER SCREEN

USER B'S BROWSER SCREEN

INFORMATION PROCESSING APPARATUS AND METHOD, AND STORAGE MEDIUM

BACKGROUND OF THE INVENTION

The present invention relates to an apparatus and a method for information processing and a storage medium for storing such a method. More particularly, the invention relates to an apparatus and a method for information processing and a storage medium for accommodating that method, whereby an avatar that is active in a shared virtual space is made to output a sound during a chat.

There have existed personal computer network services such as NIFTY-Serve (trademark) of Japan and CompuServe (trademark) of the United State. Each of these entities allows a plurality of users to connect their personal computers through modems and over a public switched telephone network to a centrally located host computer in accordance with a predetermined communication protocol. A cyberspace service called Habitat (trademark) has been known in this field.

The development of Habitat was started in 1985 by LucasFilm Ltd. of the United States. When completed, Habitat was run by QuantumLink, a U.S. commercial network, for about three years before Fujitsu Habitat (trademark) began to be offered in Japan by NIFTY-Serve in February 1990. Habitat embraces a virtual city called "Populopolis" which, drawn in two-dimensional graphics, is inhabited by users' alter egos called avatars (incarnations of Hindu deities) Through their avatars, the users carry on between them what is known as a chat (a real-time text-based dialogue in which characters are input and read by users). More detailed information about Habitat is found in "Cyberspace: First Steps" (ed. by Michael Benedikt, 1991, MIT Press, Cambridge, Mass., ISBN0-262-02327-X, PP. 282–307).

In a conventional cyberspace system run by the above-mentioned type of personal computer network service, virtual streets as well as house interiors were described in two-dimensional graphics. For apparent movement toward the depth of a scene or back to its front side, avatars were simply moved upward or downward against a two-dimensional background. There was precious little power of expression to make users enjoy a virtual experience of walking or moving about in the virtual space. Furthermore, a given user's avatar was viewed along with other users' avatars simply from a third party's point of view in the virtual space. This was another factor detracting from the effort to let users have more impressive virtual sensory experiences.

In order to improve on such more or less unimpressive proxy experiences, there have been proposed functions which display a virtual space in three-dimensional graphics and which allow users freely to move about in the virtual space from their avatars' points of view. Such functions, disclosed illustratively in U.S. Pat. No. 5,956,038, are implemented by use of 3D graphic data in description language called VRML (Virtual Reality Modeling Language). A description of various cyberspace environments in which users may carry on chats using avatars is found in the Sep. 9, 1996 issue of Nikkei Electronics (a Japanese periodical, No. 670, pp. 151–159).

Where avatars and so-called virtual pets are set to be active in such a virtual space, users are expected conventionally to operate predetermined keys selectively in order to get their avatars or virtual pets to do certain actions.

Illustratively, the present applicant has proposed a plurality of keys by which to cause an avatar to execute a set of actions in a virtual space, as shown in FIG. 1.

In the example of FIG. 1, an active key A operated by a user enables an avatar to call up a virtual pet. Operating a sleep key B causes the avatar to put the virtual pet to sleep.

Operating a feed key C causes the avatar to feed the virtual pet. A smile-and-praise key D, when operated by the user, causes the avatar to smile at and praise the virtual pet. Operation of a play-tag key E prompts the avatar to play tag with the pet in the virtual space.

A scold key F when operated causes the avatar to scold the virtual pet for discipline. Operating a brush-and-groom key G causes the avatar to brush and groom the virtual pet.

In such an environment, each action performed by the avatar corresponds to a key that needs to be operated. To get the avatar to execute more actions requires setting up more keys. The user must select one of the numerous keys for any desired action to be done by the avatar; the procedure involved makes it difficult to get the avatar to carry out desired actions rapidly.

The avatars' various actions are often performed during chats carried on between them. In such cases, the users entering strings of characters through a keyboard to conduct their chats need to find and operate suitable keys to execute desired actions by their avatars. This requires the users to get their hands off the keyboard to make the necessary operations, which tends to hamper the users' smooth text input.

SUMMARY OF THE INVENTION

The present invention has been made in view of the above circumstances and provides an apparatus and a method for causing avatars to execute actions quickly without obstructing chats.

In carrying out the present invention and according to one aspect thereof, there is provided an information processing apparatus which is connected to a server along with other information processing apparatuses through a network and which is supplied with a shared virtual space, the information processing apparatus comprises an inputting element for allowing a user to input strings of characters constituting a chat carried on via an avatar which is active in the shared virtual space as an incarnation of the user, a transmitting element for transmitting strings of characters input through the inputting element to the server as character data, a converting element for converting the character data coming from the server into audio data, and an outputting element for audibly outputting the audio data converted by the converting element.

In a preferred structure according to the present invention, the converting element may include a correspondence table storing element for storing a correspondence table in which character data are made to correspond with audio data, and a processing element for referencing the correspondence table storing element so as to convert character data transmitted from the server into the corresponding audio data.

In another preferred structure according to the present invention, the information processing apparatus may further comprise a correspondence table updating element which, in response to a query from the server, transmits to the server an ID representing a type of the correspondence table stored in the correspondence table storing element, wherein, if the server returns an updated correspondence table in response to the ID transmitted thereto, then the correspondence table updating element stores the updated correspondence table into the correspondence table storing element.

According to another aspect of the present invention, there is provided an information processing method for use with an information processing apparatus which is connected to a server along with other information processing apparatuses through a network and which is supplied with a shared virtual space, the information processing method comprises the steps of allowing a user to input strings of characters constituting a chat carried on via an avatar which is active in the shared virtual space as an incarnation of the user, transmitting the strings of characters input in the inputting step to the server as character data, converting the character data coming from the server into audio data, and audibly outputting the audio data converted in the converting step.

According to a further aspect of the present invention, there is provided a storage medium which stores a computer-readable program for use by an information processing apparatus which is connected to a server along with other information processing apparatuses through a network and which is supplied with a shared virtual space, the program comprises the steps of allowing a user to input strings of characters constituting a chat carried on via an avatar which is active in the shared virtual space as an incarnation of the user, transmitting the strings of characters input in the inputting step to the server as character data, converting the character data coming from the server into audio data, and audibly outputting the audio data converted in the converting step.

Through the use of the above-outlined information processing apparatus and method as well as storage medium for storing a program representing that method, strings of characters included in chats are converted to a sound that is output.

Other objects, features and advantages of the invention will become more apparent upon a reading of the following description and appended drawings.

BRIEF DESCRIPTION OF THE DRAWINGS

FIG. 10 is a correspondence table in which strings of characters are made to correspond with sounds;

FIG. 14 is a schematic view explaining where avatars are located illustratively in a given world;

FIG. 15 is a schematic view explaining how images typically appear on different users' screens;

DESCRIPTION OF THE PREFERRED EMBODIMENTS

Figure 1:
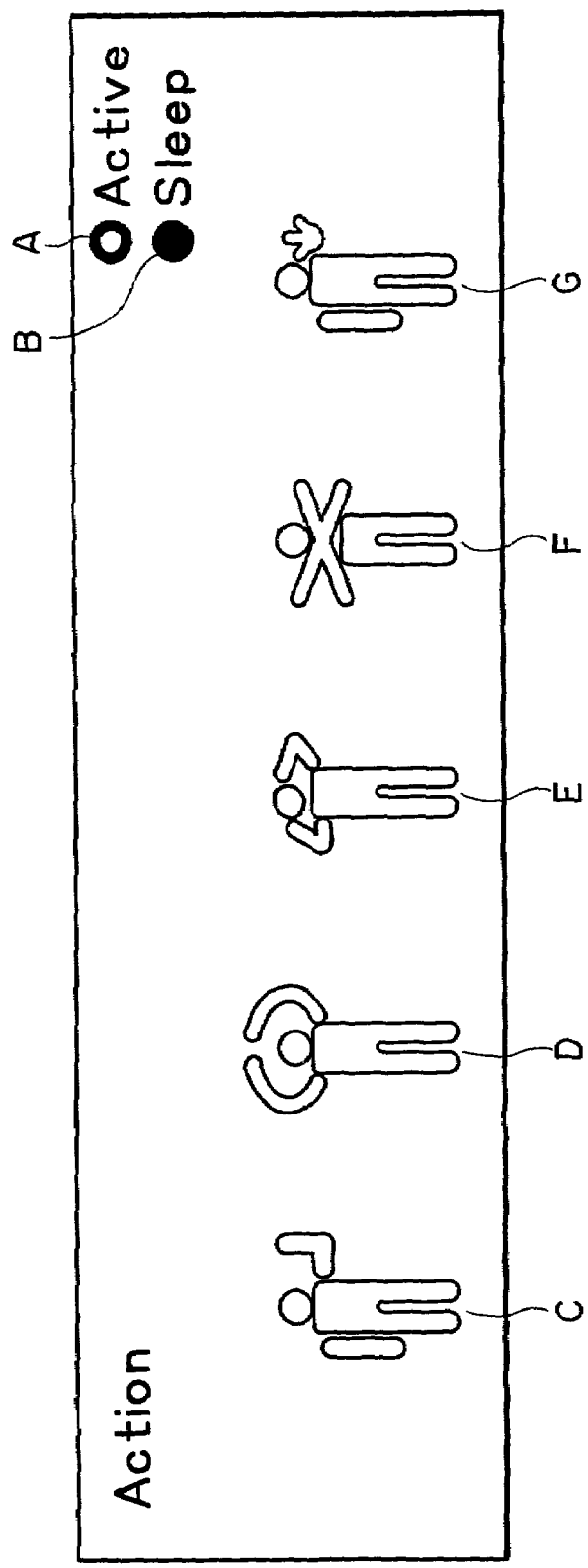
FIG. 1 is a schematic view explaining conventional action keys.

Preferred embodiments of the present invention will be described below with reference to the accompanying drawings.

For the moment, the description of the embodiments is preceded by an explanation hereunder of VRML (virtual reality modeling language), a description language capable of handling three-dimensional information in unified fashion through the use of a framework called WWW (World Wide Web) that offers diverse kinds of information over the Internet, a globally established computer network.

The WWW, an information offering system utilized on the Internet, was developed by CERN (European Center for Nuclear Research) in Switzerland. The system permits browsing over the network of information made up of text, images and sounds in what is known as hypertext format. Information held in WWW servers is transferred asynchronously to terminals such as personal computers in accordance with a protocol called HTTP (Hyper Text Transfer Protocol).

The WWW server is constituted by server software called an HTTP demon and by HTML files that store hypertext information. The demon signifies programs that perform management and processing in the background in a UNIX work environment. Hypertext information is expressed in description language called HTML (HyperText Markup Language). A hypertext description expresses a logical text structure enclosed by format codes "<" and ">" called tags. Description of links to other information is provided by link information called anchors. Locations of information are designated by anchors using URL (Uniform Resource Locator).

Files described in HTML are transferred over a TCP/IP (Transmission Control Protocol/Internet Protocol) network in accordance with the HTTP protocol. HTTP transfers requests from clients for information to WWW servers and sends hypertext information in HTML files back to the clients.

An environment in which to utilize the WWW is provided by client software called WWW browsers such as Netscape Navigator (trademark of Netscape Communications Corporation of the United States).

WWW browsers allow users to look up so-called websites, i.e., URL-compatible files in WWW servers located over the Internet expanded throughout the world. In what is known as net-surfing, users can hop from one website to another through links to access multitudes of WWW information sources.

Recently a new type of browsers called VRML browsers has been developed. A VRML browser permits users to access WWW servers one after another through links established in hypertext regarding objects drawn in an extended WWW format, i.e., three-dimensional graphics in a 3D space described in 3D graphics description language called VRML.

Details of VRML are described illustratively in "VRML: Browsing & Building Cyberspace" (by Mark Pesce; 1995, New Readers Publishing, ISBN 1-56205-498-8) and in "Latest Trends of VRML and CyberPassage" (articles by Koichi Matsuda and Yasuaki Honda in a Japanese periodical "bit" published by Kyoritsu Shuppan Co., Ltd., 1996; Vol. 28, No. 7, pp. 29–36; No. 8, pp. 57–65; No, 9, pp. 29–36; No. 10, pp. 49–58).

When a file described in VRML-compatible file format is transferred from a server to a user's personal computer and processed by browser, a three-dimensional virtual space is computed on the basis of VRML data. The 3D virtual space thus computed is allowed to appear on a display of the user's personal computer.

Figure 2:
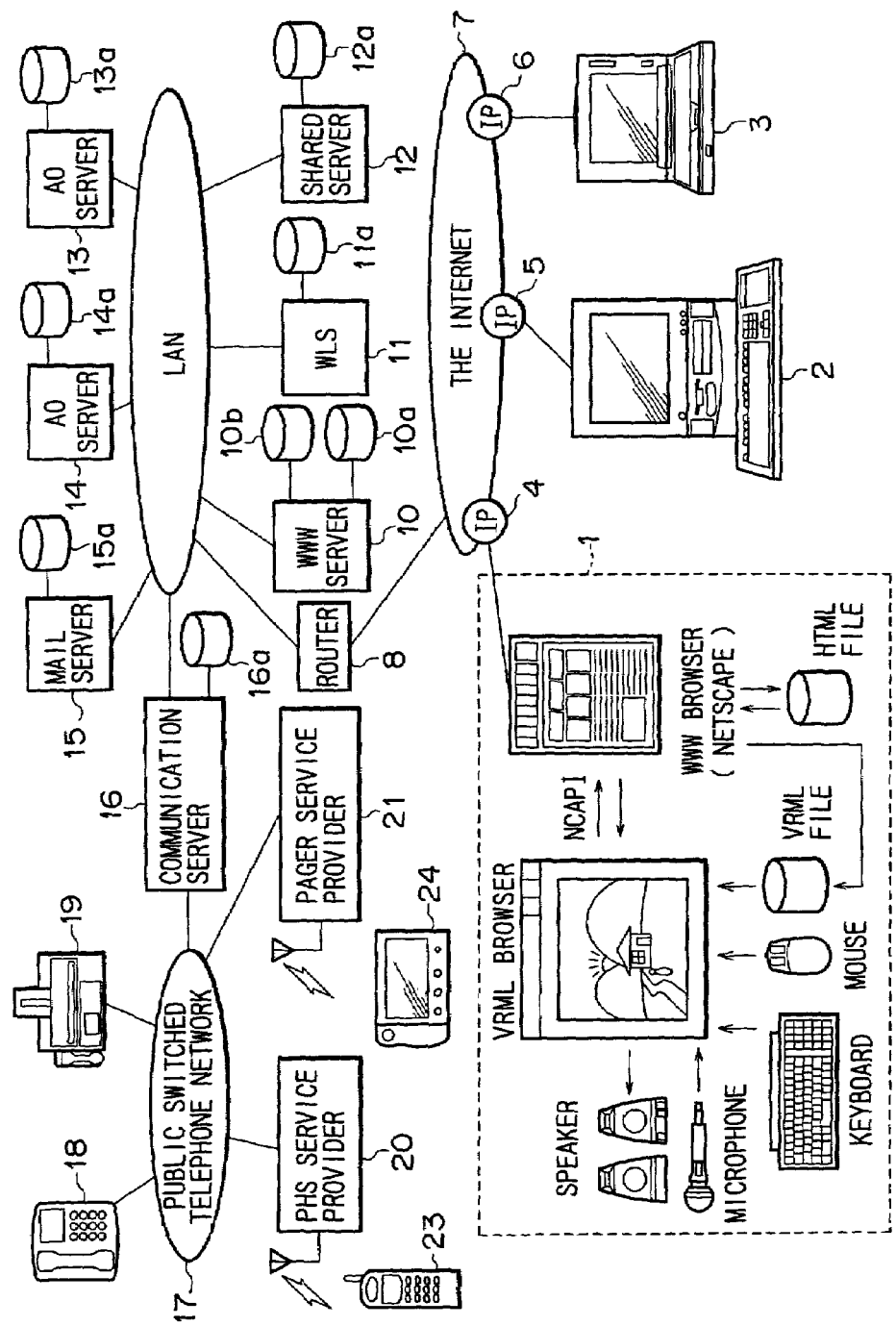
FIG. 2 is a block diagram showing a configuration of a shared virtual space offering system according to the present invention.

FIG. 2 is a block diagram showing an overall configuration of a shared virtual space offering system embodying the present invention.

In FIG. 2, reference numerals 1, 2 and 3 denote client PCs (personal computers) in which a VRML browser and a WWW browser are installed and active. The PCs are connected to the Internet via IP (Internet service providers) 4, 5 and 6.

A LAN (Local Area Network) 9 hooked up to the Internet 7 through a router 8 is connected with a WWW server 10, a WLS (World Location Server) 11, a shared server 12, AO (Application Object) servers 13 and 14, a mail server 15, and a communication server 16. These servers 10 through 16 are furnished with hard disk drives (HDD) 10a, 10b, 11a through 16a, respectively.

The communication server 16 is connected to telephone sets 18 and facsimile machines 19 via a public switched telephone network 17; to PHS (Personal Handyphone System) terminals 23 wirelessly via a PHS service provider 20; and to pager terminals 24 wirelessly via a pager service provider 21.

Figure 3:
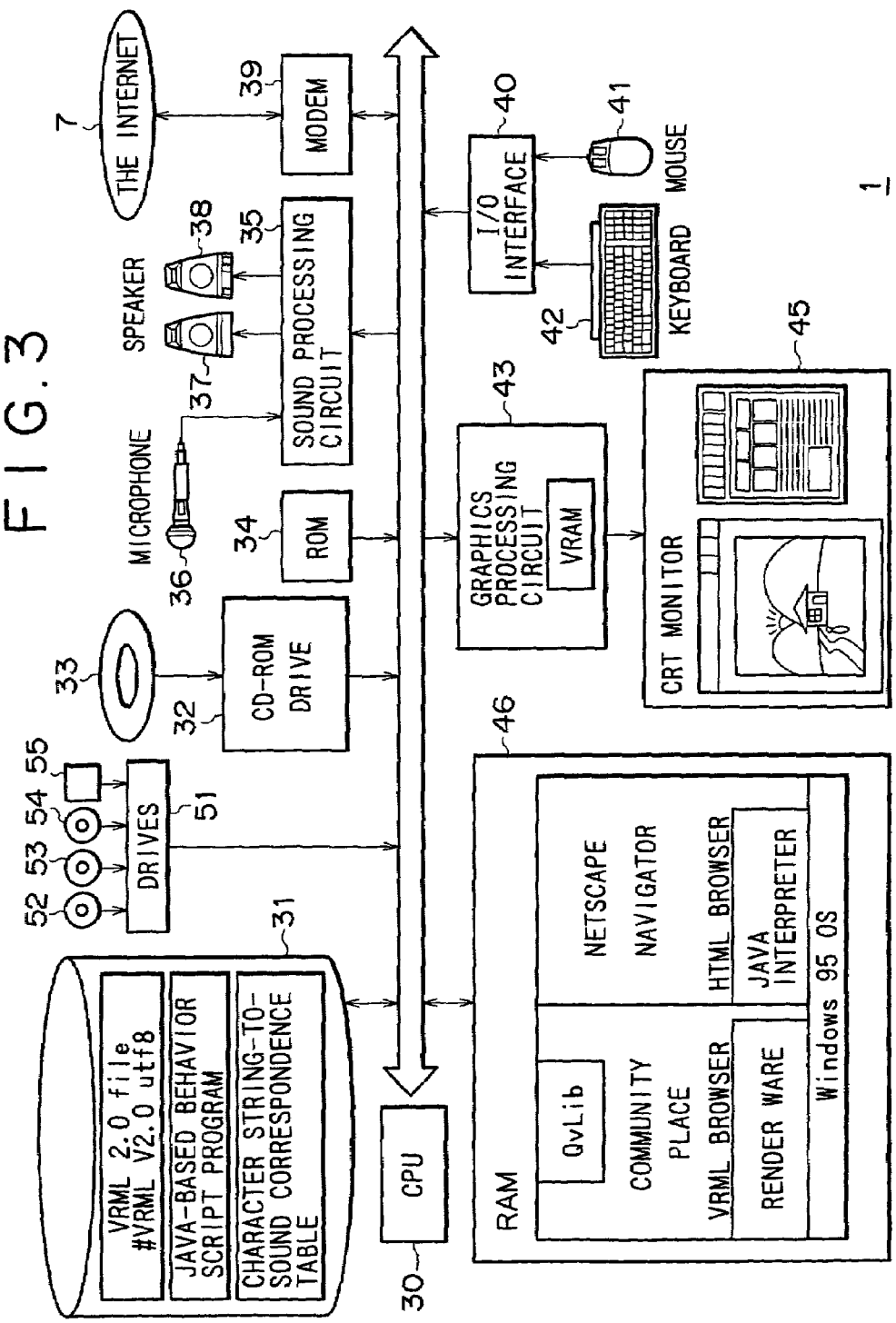
FIG. 3 is a block diagram showing a structure of a client PC in FIG. 2.

FIG. 3 is a block diagram illustrating a hardware structure of the client PC 1 shown in FIG. 2.

In FIG. 3, reference numeral 30 stands for a CPU that controls various components; 31 for a hard disk drive (HDD) that stores a VRML 2.0 file, VRML contents made up of dance script programs and a shared virtual life growth script program based on Java (trademark of Sun Microsystems, Inc. of the United States), and a table of correspondence between character strings and sounds; 32 for a CD-ROM drive for reading the VRML contents from a CD-ROM disk 33; 34 for a ROM that stores BIOS (Basic Input Output Systems) and other resources; 35 for a sound processing circuit which, connected to a microphone and a left-hand and a right-hand speaker 37 and 38, carries out speech synthesis; 39 for a modem connected to the Internet 7; 40 for an I/O (input/output) interface connected to a mouse 41 and a keyboard 42; 43 for a graphics processing circuit incorporating a VRAM 44; 45 for a CRT monitor; and 46 for a RAM.

In operation, Netscape Navigator, a WWW browser operating on Windows 95 (trademark of Microsoft Corporation of the United States); a Java interpreter; and Community Place Browser, a VRML 2.0 browser developed by Sony Corporation, are read into the RAM 46. Once placed in the RAM 46, these programs are ready to be run by the CPU 30.

The VRML 2.0 browser incorporates QvLib, i.e., a VRML parsing library (parser) developed by Silicon Graphics Inc. of the United States and offered free of charge; RenderWare, a software renderer provided by Criterion Software Ltd. of the United Kingdom; or a parser and a renderer having functions equivalent to those of the cited.

As shown in FIG. 2, Community Place Browser exchanges various data with Netscape Navigator acting as a WWW browser on the basis of NCAPI (Netscape Client Application Programming Interface; a trademark).

Netscape Navigator is fed with an HTML file and VRML contents (including a VRML file and a Java-based script program) from the WWW server 10 over the Internet 7. The received file and contents are recorded onto the local HDD 31. Netscape Navigator processes the HTML file to display text and images on the CRT monitor. Community Place Browser, on the other hand, processes the VRML file to display a 3D virtual space on the CRT monitor and varies the behaviors of objects in the 3D virtual space in keeping with the results of processing of the script programs by the Java interpreter.

Although not shown, the other client PCs 2 and 3 have the same structure as the client PC 1.

Figure 4:
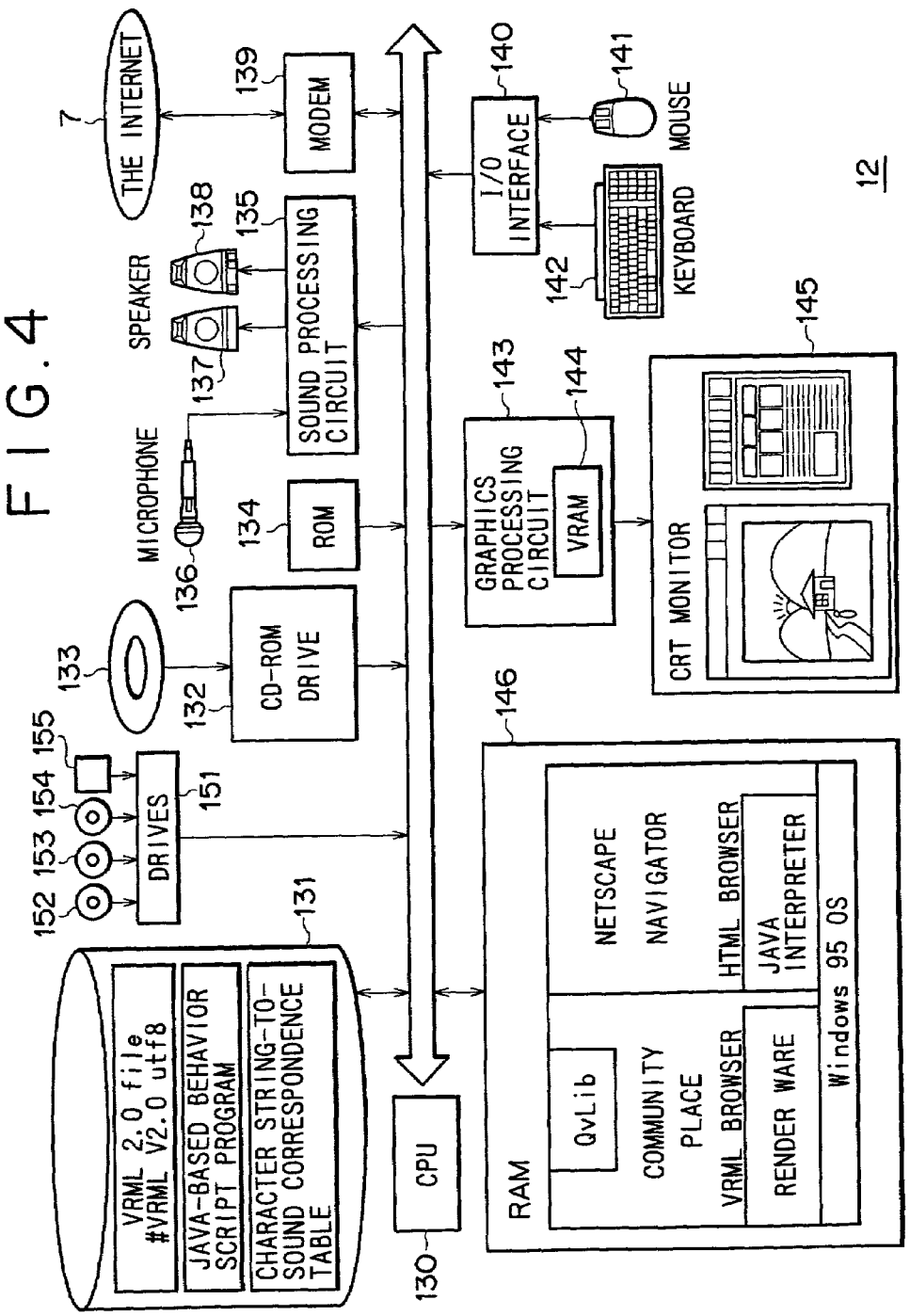
FIG. 4 is a block diagram of a shared server in FIG. 2.

FIG. 4 is a block diagram showing a typical structure of the shared server 12. The structure of the shared server 12 is basically the same as that of the client PC 1 in FIG. 3. The components in FIG. 3 ranging from the CPU 30 to the ROM 46 are reflected in FIG. 4 as a CPU 130 through a ROM 146 respectively. The basic functions of these components in FIG. 4 are the same as those of their counterparts in FIG. 3 and thus will not be described further.

Below is a description of how the above-described embodiment of the present invention works.

As an example, it is assumed here that VRML contents are downloaded over the Internet and turned into a multi-user environment where a single virtual space is shared by a plurality of users. Typical steps constituting the processing involved are described below with reference to FIGS. 5 through 7.

Figure 5:
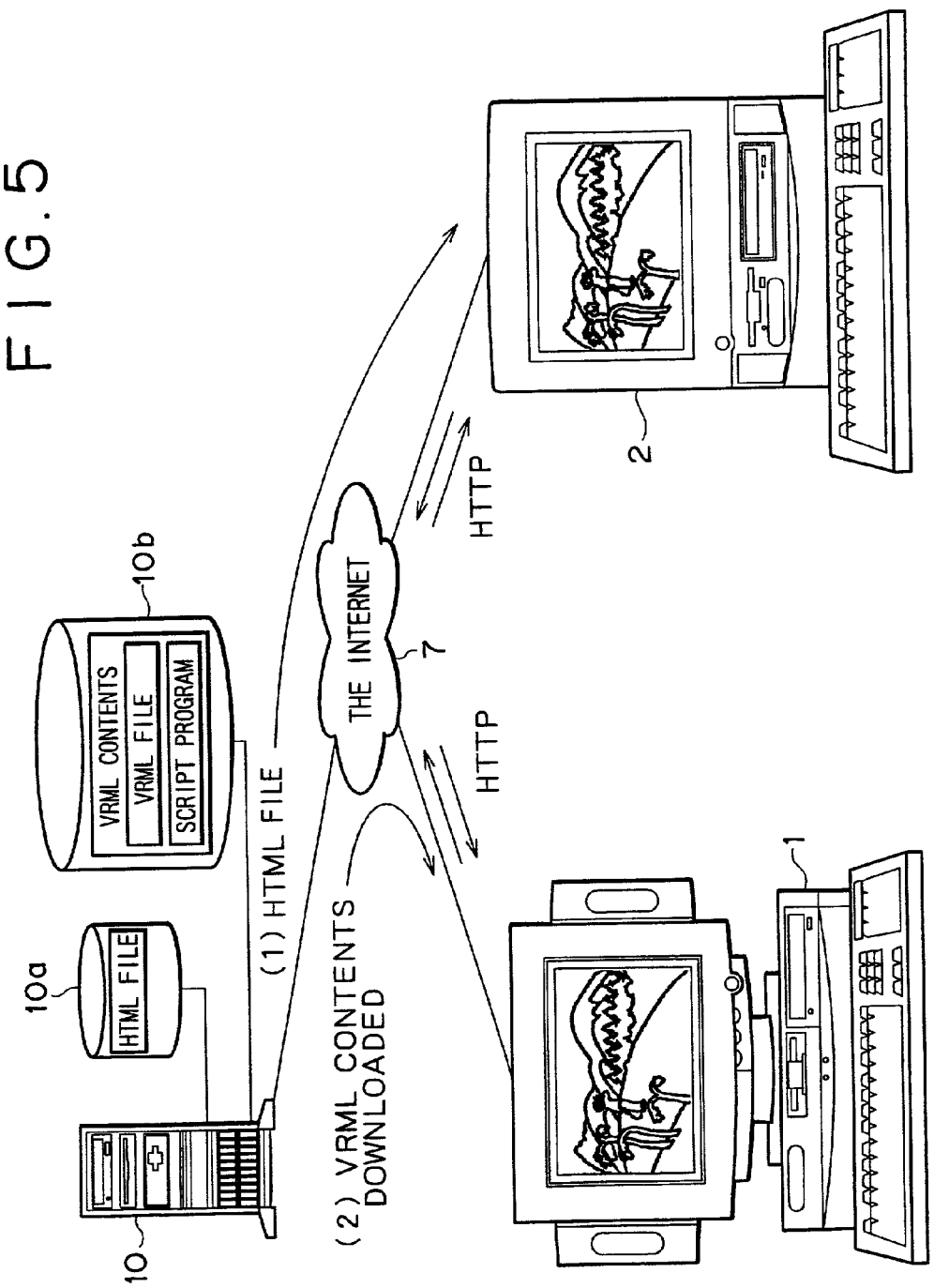
FIG. 5 is a schematic view showing a typical setup in which the system of FIG. 2 works.

In FIG. 5, as indicated by numeral (1), the WWW browser is first used to browse the home page of a website offering VRML contents. In this example, a typical website is looked up. As pointed to by numeral (2), users of the client PCs 1 and 2 each download from the website the VRML contents made up of the VRML 2.0 file and script program (Java-based growth script program) to implement autonomous avatar behavior in a VRML space.

Obviously, the VRML contents may be provided by means of a CD-ROM disk 33 and may be read therefrom through the CD-ROM drive 32.

Figure 6:
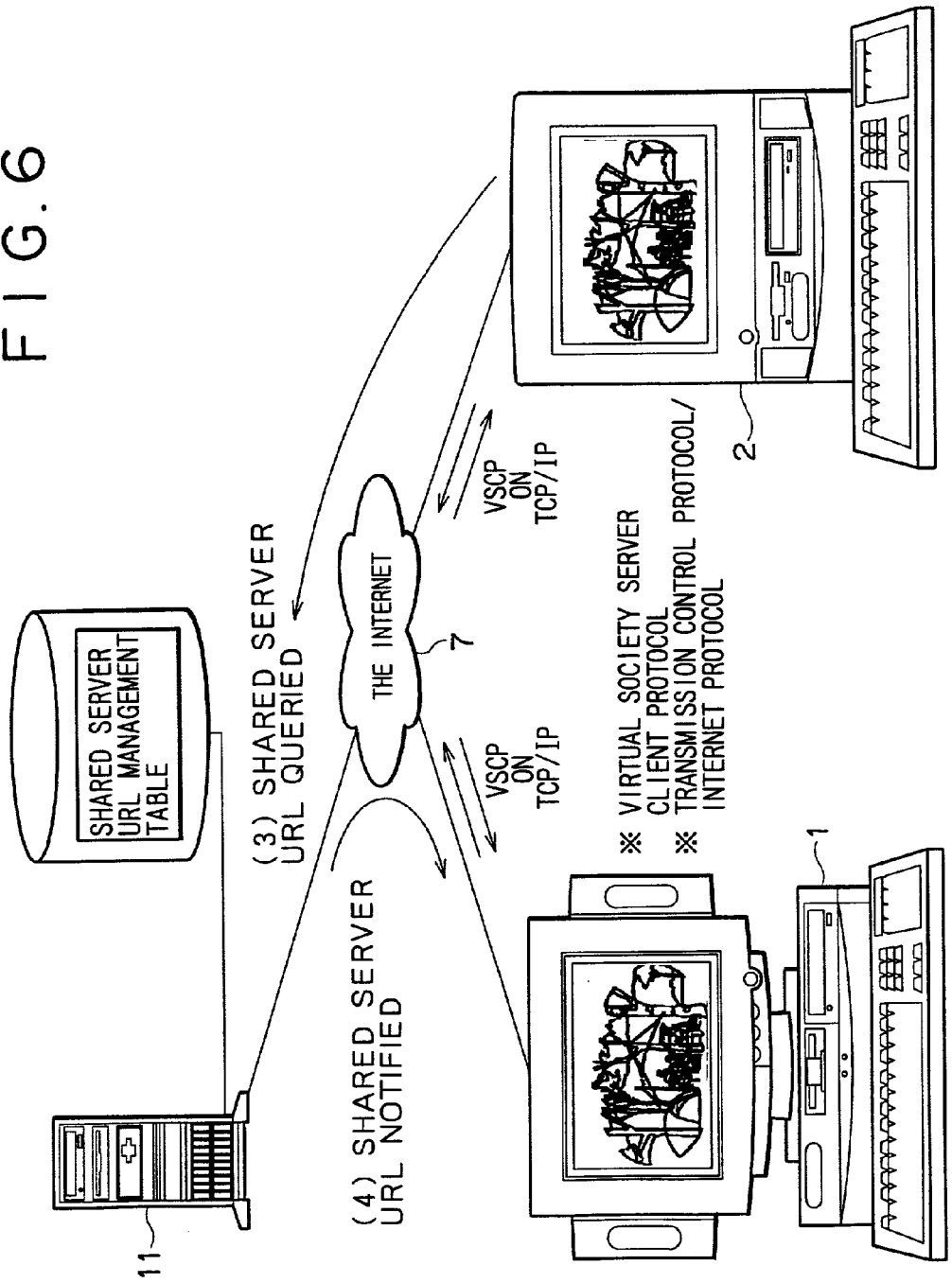
FIG. 6 is a schematic view depicting another typical setup in which the system of FIG. 2 works.

In each of the client PCs 1 and 2, as shown in FIG. 6, Community Place Browser acting as a VRML 2.0 browser interprets and executes the VRML 2.0 file that has been downloaded and stored onto the local HDD 31. As indicated by numeral (3), the browser queries the WLS 11 about a URL of the shared server 12 based on VSCP (Virtual Society Server Client Protocol). In response, as indicated by numeral (4), the WLS 11 refers to a shared server URL management table held on the HDD 11a and notifies the client PCs 1 and 2 of the URL of the shared server 12 retrieved from the table.

Figure 7:
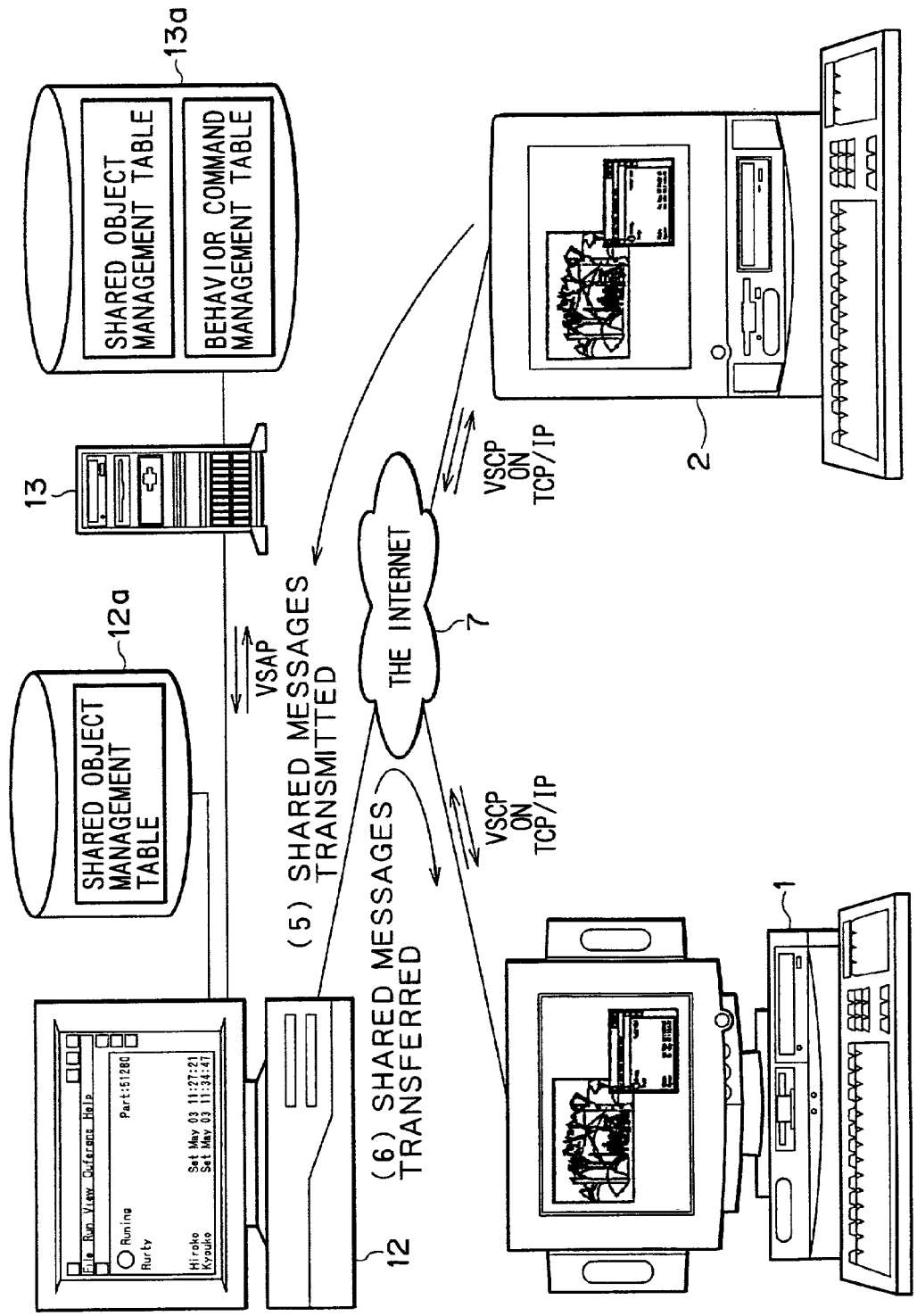
FIG. 7 is a schematic view indicating still another typical setup in which the system of FIG. 2 works.

Using the URL, the client PCs 1 and 2 link up to the shared server 12 as illustrated in FIG. 7. The linkup permits transmission of shared messages through the shared server 12 regarding locations and motions of shared 3D objects, as indicated by numeral (5). The transmission of the shared messages implements a multi-user environment, as pointed to by numeral (6).

More detailed steps for implementing the connection above are discussed in U.S. Pat. No. 5,956,038.

The AO server 13 that manages behaviors of virtual life objects in the shared virtual space exchange data about the virtual life objects with the shared server 12 by use of VSAP.

Figure 8:
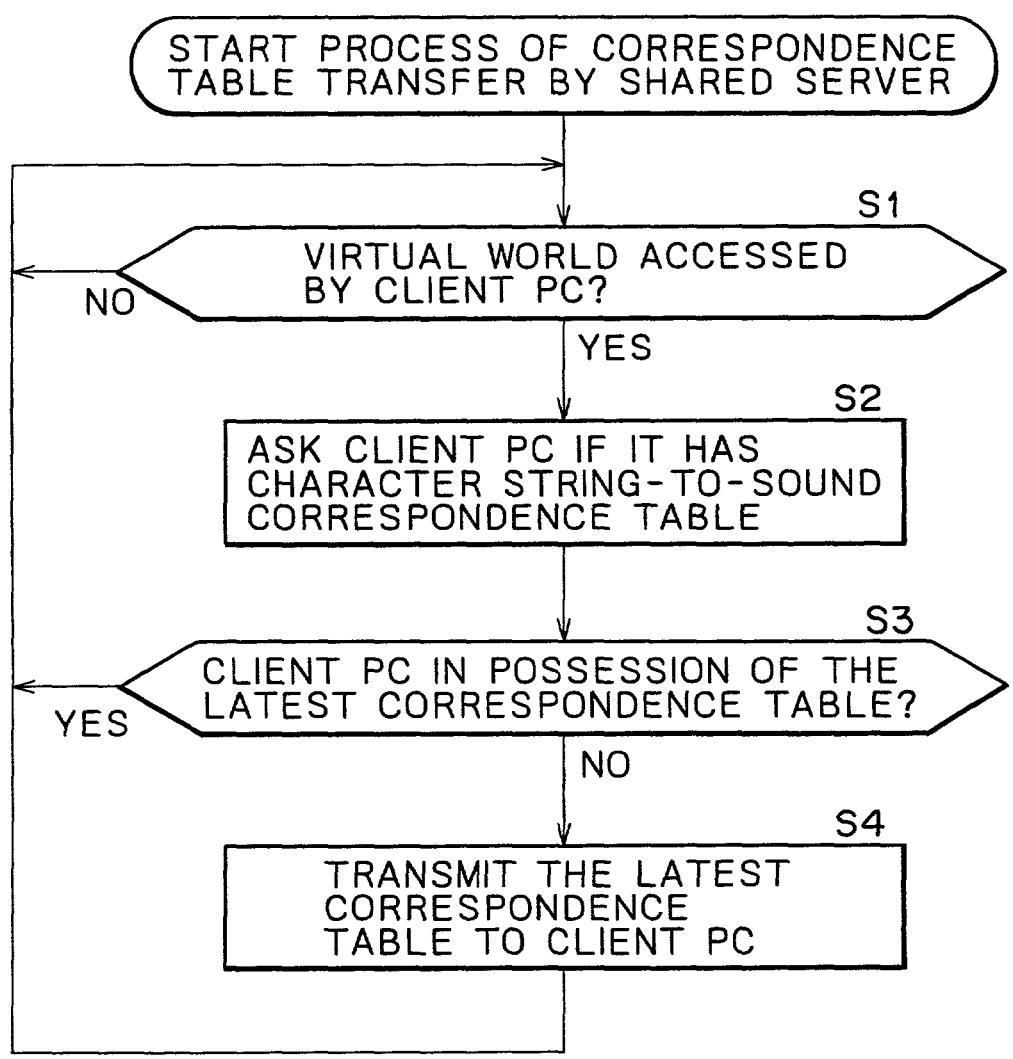
FIG. 8 is a flowchart of steps constituting a correspondence table transfer process performed by the shared server in FIG. 2.

Below is a description of processes performed when a client PC (e.g., client PC 1) accesses the shared server 12 to take part in a shared virtual space. When accessed by the client PC 1, the shared server 12 causes the client PC 1 to acquire and retain data making up a table of correspondence between character strings and sounds so that the client will be able to carry on a chat. The shared server 12 performs steps constituting the flowchart of FIG. 8, while the client PC 1 executes steps forming the flowchart of FIG. 9.

In step S1, the CPU 130 of the shared server 12 waits for the client PC 1 to gain access to the virtual world. When the client PC 1 is judged to have gained access, step S2 is reached. In step S2, the accessing client PC (PC 1 in this case) is asked if it has the table of correspondence between character strings and sounds. This is a table that describes relations between character strings and the sounds corresponding thereto, as shown in FIG. 10. In the example of FIG. 10, a sound 1 is stored corresponding to a character string "Good afternoon"; a sound 2 is stored corresponding to a character string "Good evening"; and so on. A sound "n" is stored corresponding to a character string "Yoo-hoo."

The sound 1 denotes data representing a corresponding sound generated by the avatar when the character string "Good afternoon" is detected; the sound 2 stands for data representing a corresponding sound generated by the avatar when the character string "Good evening" is detected; and son on. The sound "n" denotes data indicative of a corresponding sound generated by the avatar when the character string "Yoo-hoo" is detected.

Figure 9:
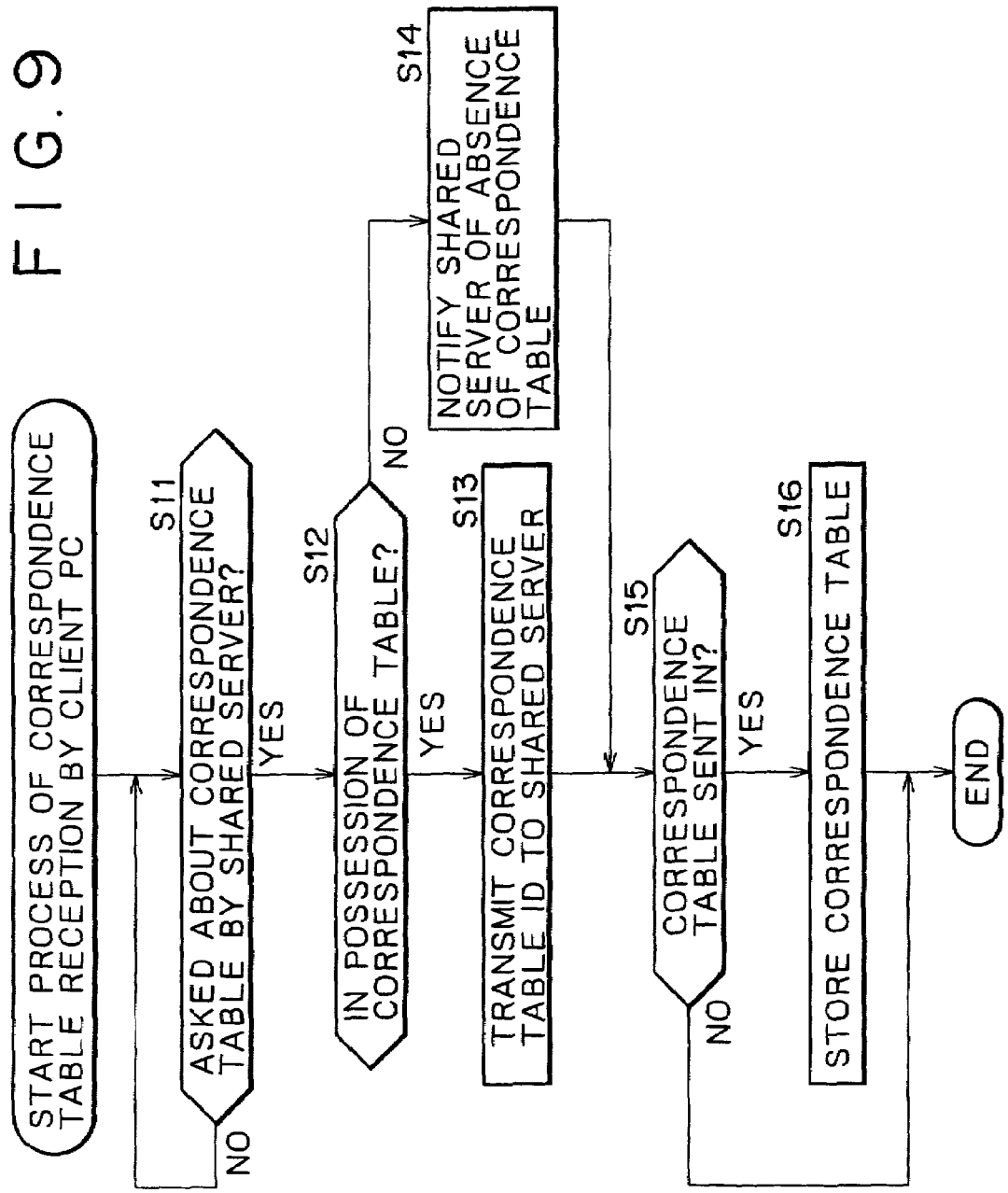
FIG. 9 is a flowchart of steps making up a correspondence table receiving process performed by the client PC in FIG. 2.

In step S11 of FIG. 9, the CPU 30 of the client PC 1 having accessed the virtual world waits to be asked about the correspondence table by the shared server 12. When queried about the correspondence table, the CPU 30 goes to step S12. In step S12, a check is made to see if the client PC 1 retains the correspondence table in question. More specifically, the CPU 30 ascertains whether the hard disk drive 31 contains the table of correspondence between character strings and sounds. If no such table is found, step S14 is reached in which the CPU 30 notifies the shared server 12 of the absence of the table in question through the modem 39 and over the Internet 7.

If in step S12 the character string-to-sound correspondence table is judged stored on the hard disk drive 31, then step S13 is reached. In step S13, the CPU 30 reads the stored correspondence table ID from the hard disk drive 31 and notifies the shared server 12 of the presence of the table through the modem 39 and over the Internet 7.

Step S3 follows step S2 in which the CPU 130 of the shared server 12 asked the client PC whether it had the correspondence table. In step S3, the CPU 130 waits for a response from the client PC. Given a response, the CPU 130 determines whether the client PC has the latest correspondence table.

That is, upon receipt of a correspondence table ID from the client PC 1, the CPU 130 compares the ID with that of the correspondence table held on its own hard disk drive 131. If the ID from the client PC is judged to be an old ID upon comparison, step S4 is reached in which the latest correspondence table is read from the hard disk drive 131 and transmitted to the client PC. More specifically, the CPU 130 sends data constituting the correspondence table retrieved from the hard disk drive 131, to the client PC 1 through a modem 139 and over the Internet 7.

A similar process is also carried out when the client PC has reported the absence of such a correspondence table.

Meanwhile, if the CPU 130 judges that the ID from the client PC matches that of the latest correspondence table the server possesses, then there is no need to transmit the table. In that case, step S1 is reached and subsequent steps are repeated.

After step S13 or S14, the CPU 30 of the client PC 1 reaches step S15 in which a check is made to see if the correspondence table data have been transmitted from the shared server 12. If the data are judged to have been sent, step S16 is reached in which the transmitted correspondence table is stored onto the hard disk drive 31. If the correspondence table has not been sent within a predetermined time period, step S16 is skipped.

In the manner described, each client PC taking part in the 3D virtual space (world) offered by the shared server 12 is made to retain beforehand the table of correspondence between character strings and sounds shown in FIG. 10.

Figure 11:
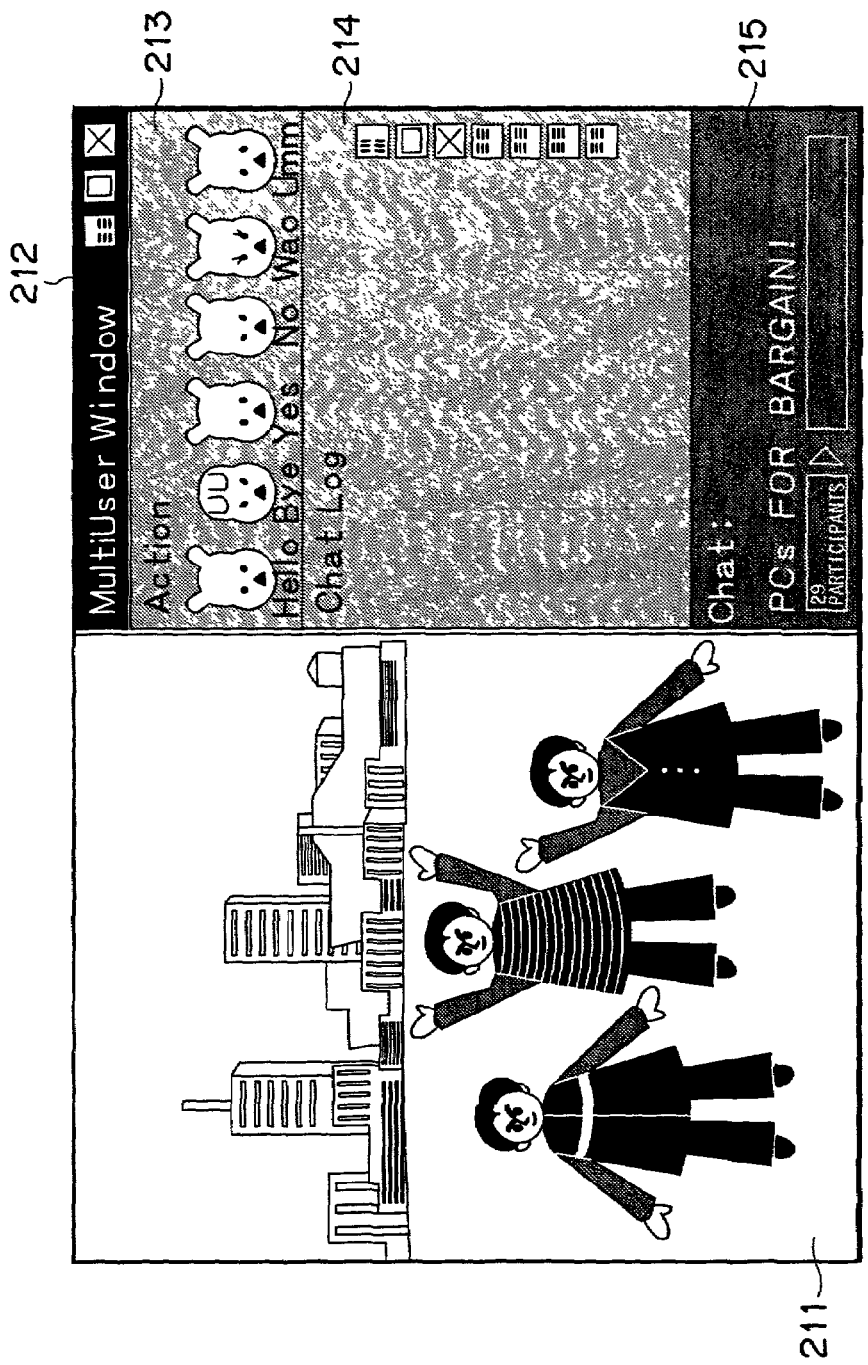
FIG. 11 is a schematic view of a typical display on a CRT monitor of the client PC in FIG. 3.

On the CRT monitor 45 of each client PC participating in the virtual world, the browser causes a picture shown in FIG. 11 to appear. More specifically, on the left-hand half of the screen, a world display window 211 appears along with an image of the virtual world in which the client PCs are taking part.

To the right of the world display window 211 appears a multi-user window 212. At the top of the window 212 is an action key display area 213 showing keys for each user to operate when prompting his or her virtual pet to perform certain actions in the virtual world. A "Hello" key is operated by the user prompting his or her pet to perform a welcoming action together with a sound "Hello." A "Bye" key, when operated, causes the user's pet to execute a leave-taking action along with a sound "Bye." Operating a "Yes" key prompts the pet to carry out a concurring action accompanied by a sound "Yes." A "No" key is operated by the user who wants his or her pet to perform a repudiating action along with a sound "No."

Operating a "Wao" key causes the virtual pet to take on an awe-struck attitude together with a sound "Wao." An "Umm" key, when operated, prompts the pet to execute a perplexed posture accompanied by a sound "Umm."

Under the action key display area 213 is a chat log display area 214. This is an area that displays a chat being carried on by the avatars or pets in the vicinity of each user's own avatar or pet.

Under the chat display area 214 is an input chat display area 215. This area displays character strings input by the user taking part in the chat through the keyboard 42.

Figure 12:
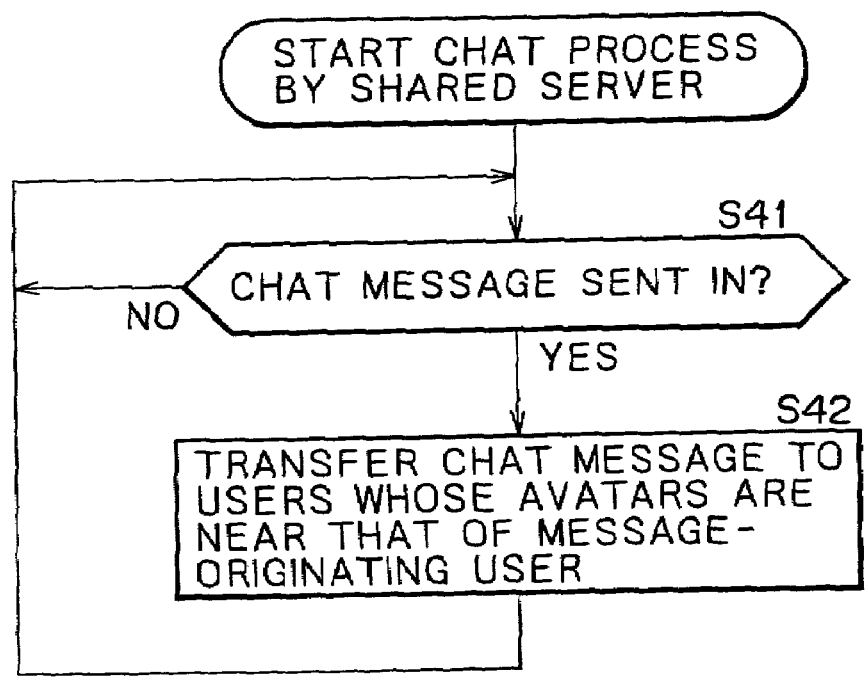
FIG. 12 is a flowchart of steps constituting a chat process performed by the shared server in FIG. 2.
Figure 13:
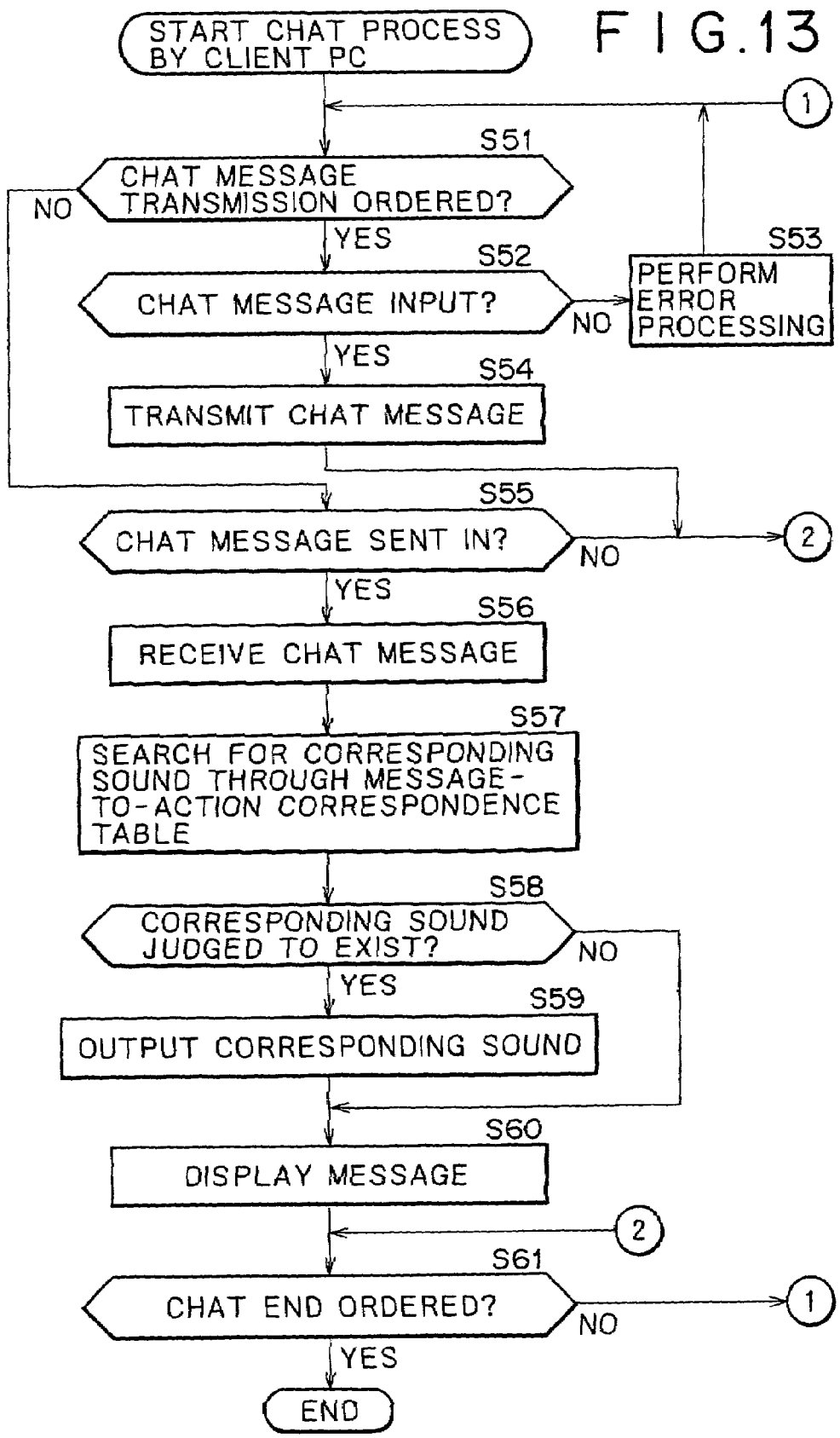
FIG. 13 is a flowchart of steps making up a chat process carried out by the client PC in FIG. 2.

Described below with reference to the flowcharts of FIG. 12 and 13 is how a chat is carried on by users participating in the virtual world through their avatars.

FIG. 12 is a flowchart of steps constituting a chat process performed by the shared server 12, and FIG. 13 is a flowchart of steps making up a chat process carried out by the client PC.

In step S41 of FIG. 12, the CPU 130 of the shared server 12 waits for chat messages to be sent from client PCs taking part in the virtual world. Upon receipt of a chat message from a user, the CPU 130 transfers in step S42 the message to the client PCs of other users whose avatars are located near the avatar of the message-originating user. The CPU 130 of the shared server 130 repeats this process.

In step S51 of FIG. 13, the CPU 30 of a client PC checks to see if a chat message transmission is ordered. If the order is judged to be given, step S52 is reached in which the CPU 30 checks whether a chat message has been input. That is, a check is made to see if a chat message to be transmitted is displayed in the input chat display area 215 of FIG. 11 after being input by the user operating the keyboard 42. If no chat message is judged input, step S53 is reached in which the CPU 30 performs error processing. Thereafter, the processing is returned to step S51 and subsequent steps are repeated.

If in step S52 a chat message is judged input and displayed in the input chat display area 215, step S54 is reached. In step S54, the CPU 30 performs a process to transmit the chat message in question. Specifically, the CPU 30 sends the input chat message to the shared server 12 through the modem 39 and over the Internet 7.

The chat message is transferred to the users whose avatars are located near that of the message-originating user, as explained above with reference to the flowchart of FIG. 12.

Suppose that, as shown in FIG. 14, an avatar "a" of a user A, an avatar "b" of a user B, and an avatar "c" of a user C are active in a world 200, positioned relative to one another as illustrated. In that case, as shown in FIG. 15, the screen displayed by the user A's browser shows the user's own avatar "all" at the center with the avatar "b" on the right and avatar "c" on the left; the screen displayed by the user B's browser indicates the user's own avatar "b" at the center with the avatar "c" on the right and avatar "a" on the left; the screen displayed by the user C's browser likewise presents the user's own avatar "c" at the center with the avatar "a" on the right and the avatar "b" on the left.

It is also possible for each user to make his or her own avatar disappear from the screen.

Figure 16:
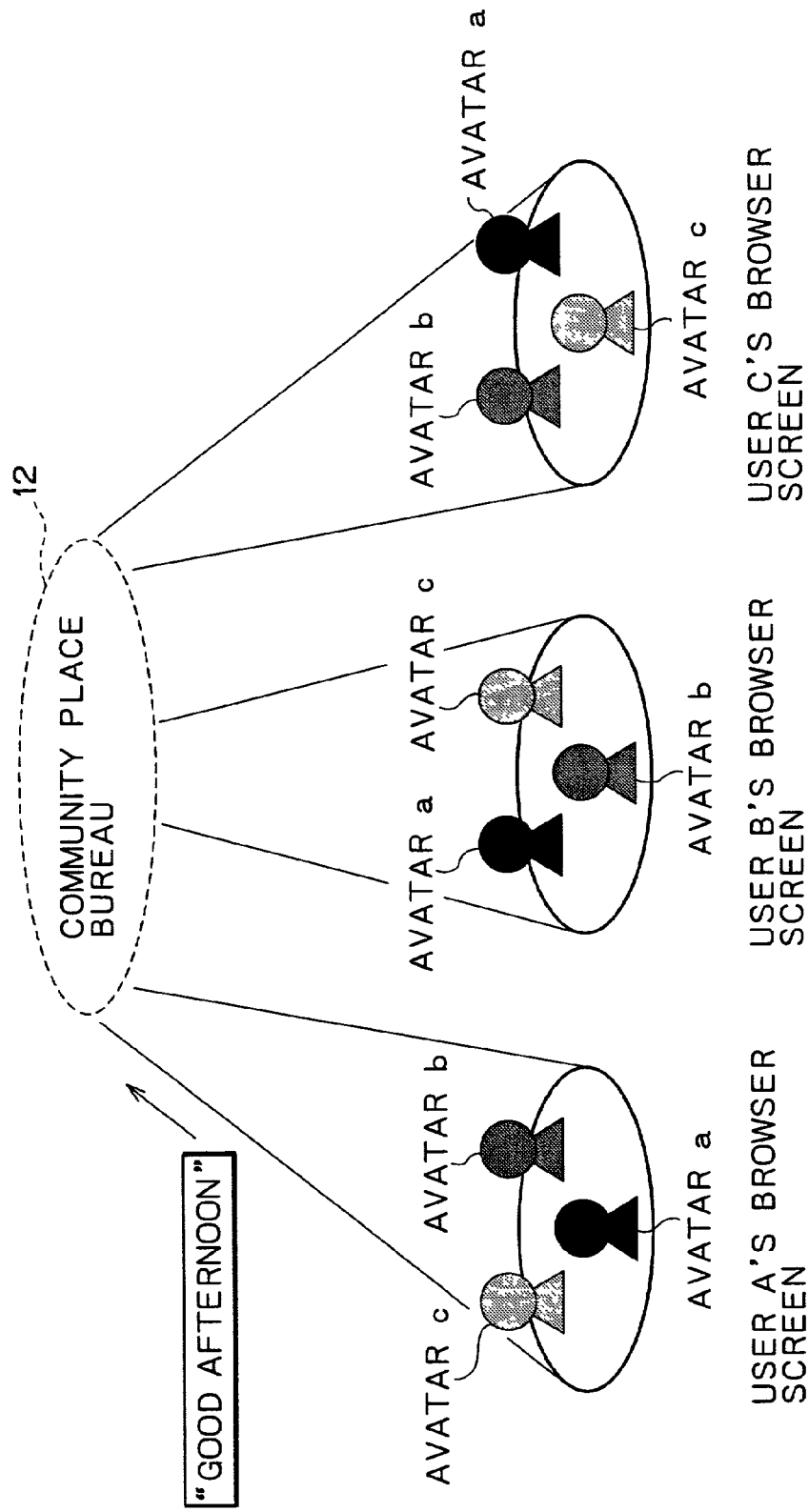
FIG. 16 is a schematic view explaining how strings of characters are transferred.
Figure 17:
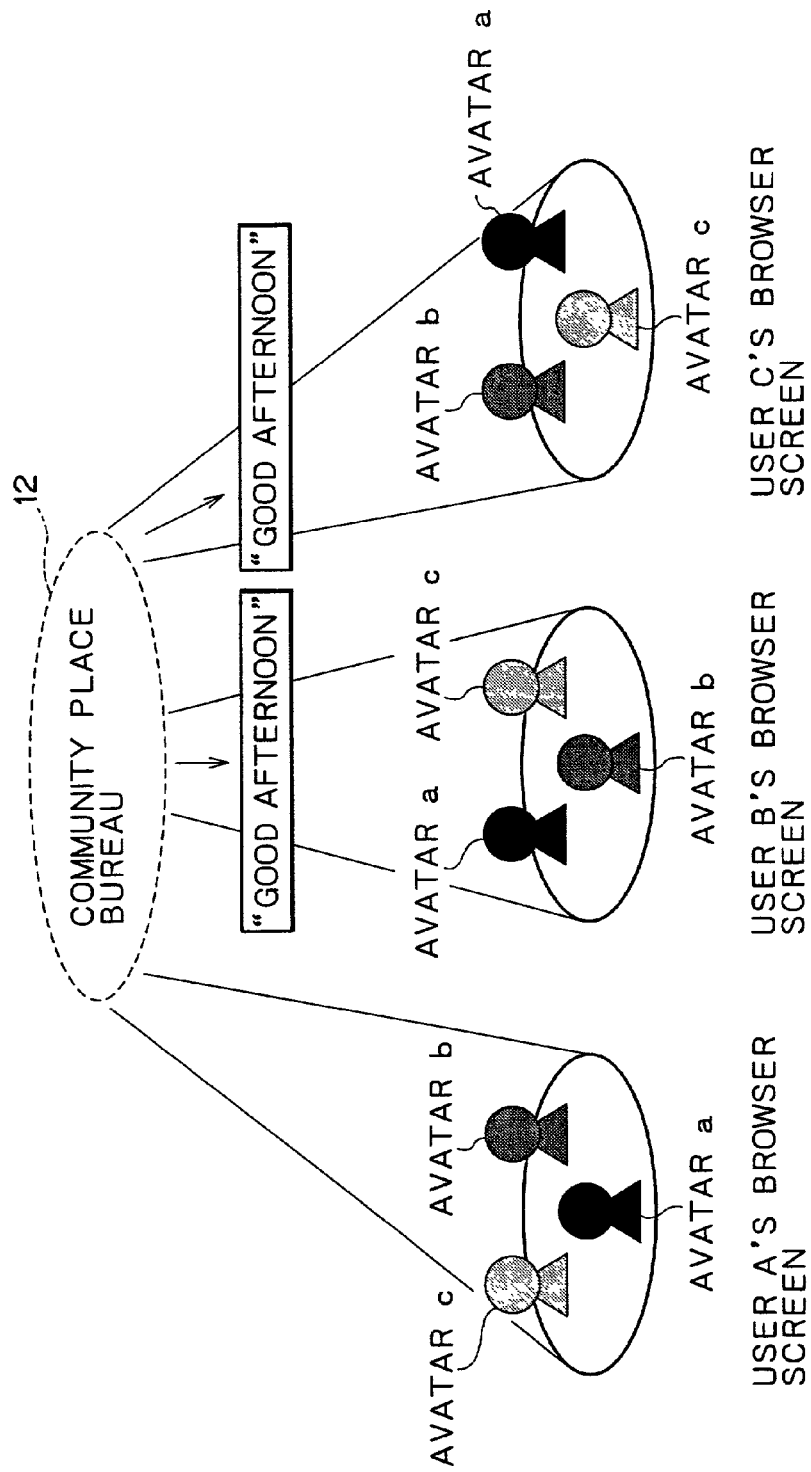
FIG. 17 is another schematic view explaining how strings of characters are transferred.

Suppose now that, as shown illustratively in FIG. 16, the user A of the avatar "a" outputs a message "Good afternoon." The message is transferred by the shared server 12 (called Community Place Bureau) to the other avatars (avatars "b" and "c" in this example) near the avatar "a" as indicated in FIG. 17. As a result, the message "Good afternoon" appears as a chat message from the avatar "a" in the chat log display area 214 on each user's browser screen.

The CPU 30 of the client PC then goes to step S61. In step S61, the CPU 30 checks to see if the user has ordered an end to the chat. If there is no order to end the chat, step S51 is reached again and subsequent steps are repeated.

If in step S51 transmission of the chat message is not judged to be ordered, the CPU 30 goes to step S55. In step S55, the CPU 30 checks whether any chat message has been sent from another user (i.e., avatar). If a chat message is not judged to be sent from any other user, step S61 is reached in which a check is made to see if a chat end order is issued. If the chat end order is not judged issued, step S51 is reached again and subsequent steps are repeated.

If in step S55 a chat message is judged to have been transmitted from another user, step S56 is reached. In step S56, the CPU 30 causes the modem 39 to receive the chat message transferred over the Internet 7. In step S57, the CPU 30 checks whether the correspondence table contains any sound corresponding to the message received in step S56. Illustratively, if a message "Good afternoon" is received, a search is made for the matching sound through the character string-to-sound correspondence table retained on the hard disk drive 31.

In step S58, the CPU 30 judges, following the search, whether the sound matching the received chat message exists in the correspondence table. If the corresponding sound is judged to exist, step S59 is reached in which the sound is audibly output as a voice of the avatar representing the user who has sent the message in question.

In the example of FIG. 17, the user B's screen illustratively displays the message "Good afternoon" coming from the avatar "a." In such a case, the CPU 30 of the user B's client PC 2 checks to see if a character string "Good afternoon" is found in the correspondence table retained on the hard disk drive 31. If the character string is judged to exist in the correspondence table, the corresponding sound is retrieved from the table. In the example of FIG. 10, the sound 1 is stored in correspondence with the character string "Good afternoon." The CPU 30 of the user B's client PC 2 then feeds data constituting the sound 1 to the sound processing circuit 35 for speech synthesis. The resulting sound is audibly output by the speakers 37 and 38 as a voice of the avatar "a" displayed on the CRT monitor 45.

Figure 18:
FIG. 18 is a schematic view of a typical screen in effect before a character string corresponding to a sound is received.
Figure 19:
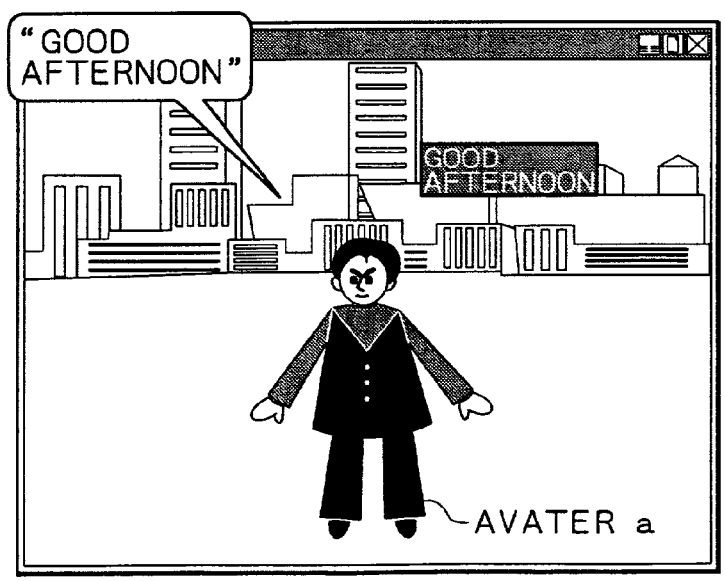
FIG. 19 is a schematic view of a typical screen that appears after the character string along with its sound is received.

In this manner, with the avatar "a" displayed as shown in FIG. 18, the received chat message "Good afternoon" from the avatar "a" is turned into a voice "Good afternoon" that is apparently generated by the avatar "a" as indicated in FIG. 19.

If in step S58 no sound is judged to exist corresponding to the character string constituting the chat message, then step S59 is skipped and step S60 is reached. In step S60, the CPU 30 causes the received message to appear in the chat log display area 214.

The processing is then passed on to step S61 in which a check is made to see if a chat end order is issued. If there is no chat end order, step S51 is reached again and subsequent steps are repeated. If a chat end order is judged to be given in step S61, the chat process is terminated.

Although images in the shared virtual space have been described above as generated on the side of client PCs, this is not limitative of the invention; these images may be generated alternatively by the shared server 12. The alternative setup, however, tends to increase burdens on the shared server 12 as the number of client PCs connected to the server 12 grows. Under the circumstances, it is preferable for the client PCs to take on the processing involved.

The above series of steps may be executed either on a hardware or on a software basis. If the steps are to be carried out by software, the programs involved are installed into the client PCS 1, 2 and 3 as well as into the shared server 12 from the Internet 7 or from a suitable storage medium.

As shown in FIG. 3 or 4, the storage medium is distributed, apart from computers, for the purpose of providing users with necessary programs. The programs may be retained illustratively on package media other than the CD-ROMs 33 and 133, such as optical disks 52 and 152 like DVDs (Digital Versatile Disks) to be loaded into drives 51 and 151, magnetic disks 53 and 153 (including floppy disks), magneto-optical disks 54 and 154 (including MDs (Mini-Disks)), or semiconductor memories 55 and 155. The programs may otherwise be offered to users in a manner preinstalled in the ROMs 34 and 134 or on the hard disk drives 31 and 131 of the client PC 1 and shared server 12.

In this specification, the steps which are stored on a program storage medium and which describe the programs to be executed represent not only processes that are carried out in the depicted sequence (i.e., on a time series basis) but also those that are conducted parallelly or individually.

In this specification, the term "system" refers to a whole configuration made up of a plurality of component devices.

As described, the information processing apparatus and method according to the invention as well as the inventive program stored on the storage medium allow sounds to be generated corresponding to character strings included in chats. During a text-based chat session, avatars are made to act in diverse fashion rapidly and reliably so that the users may enjoy proxy conversations of enriched contents. In such cases, manipulative chores that could hamper the smooth flow of users' chat-related operations are reduced. Because the amount of data to be transmitted is substantially less than that of audio data, a sound-based chat system is implemented with no change or addition to the existing network system.

As many apparently different embodiments of this invention may be made without departing from the spirit and scope thereof, it is to be understood that the invention is not limited to the specific embodiments thereof except as defined in the appended claims.

What is claimed is:

1. An information processing apparatus connected to a server along with other information processing apparatuses through a network and which is supplied with a shared virtual space, said information processing apparatus comprising:

an inputting unit configured to allow a user to input strings of characters constituting a chat carried on via an avatar which is active in said shared virtual space as an incarnation of said user;

a transmitting unit configured to transmit said strings of characters input through said inputting means unit to said server as character data;

a converting means for converting said character data coming from said server into audio data including a correspondence table storing means for storing a correspondence table in which character data are made to correspond with audio data; and a processing means for referencing said correspondence table storing means so as to convert character data transmitted from said server into the corresponding audio data;

an output configured to audibly output said audio data converted by said converting means; and correspondence table updating means which, in response to a query from said server, transmits to said server an ID representing a type of said correspondence table stored in said correspondence table storing means, wherein, if said server returns an updated correspondence table in response to said ID transmitted thereto, then said correspondence table updating means stores said updated correspondence table into said correspondence table storing means.

2. An information processing method for use with an information processing apparatus which is connected to a server along with other information processing apparatuses through a network and which is connected to a server along with other information processing apparatuses through a network and which is supplied with a shared virtual space, said information processing method comprising the steps of:

allowing a first user to input strings of characters constituting a chat carried on via an avatar which is active in said shared virtual space as an incarnation of the first user;

storing audio data and strings of characters in a correspondence table such that the audio data is made to correspond to the strings of characters;

transmitting said strings of characters input in said inputting step to said server as character data;

receiving strings of characters from the server sent by a second user;

searching whether the correspondence table contains any audio data corresponding to said strings of characters received;

converting said character data coming from said server into audio data;

audibly outputting said audio data converted in said converting step as a voice of the avatar representing the second user; and correspondence table updating means which, in response to a query from said server, transmits to said server an ID representing a type of said correspondence table stored in said correspondence table storing means, wherein, if said server returns an updated correspondence table in response to said ID transmitted thereto, then said correspondence table updating means stores said updated correspondence table into said correspondence table storing means.

3. A storage medium which stores a computer-readable program for use by an information processing apparatus which is connected to a server along with other information processing apparatuses through a network and which is supplied with a shared virtual space, the program comprising the steps of:

allowing a first user to input strings of characters constituting a chat carried on via an avatar which is active in said shared virtual space as an incarnation of said user;

storing audio data and strings of characters in a correspondence table such that the audio data is made to correspond to the strings of characters;

transmitting said strings of characters input in said inputting step to said server as character data;

receiving strings of characters from the server sent by a second user;

searching whether the correspondence table contains any audio data corresponding to said strings of characters received;

converting said character data coming from said server into audio data;

audibly outputting said audio data converted in said converting step as a voice of the avatar representing the second user; and correspondence table updating means which, in response to a query from said server, transmits to said server an ID representing a type of said correspondence table stored in said correspondence table storing means, wherein, if said server returns an updated correspondence table in response to said ID transmitted thereto, then said correspondence table updating means stores said updated correspondence table into said correspondence table storing means.

* * * * *

UNITED STATES PATENT AND TRADEMARK OFFICE
CERTIFICATE OF CORRECTION

PATENT NO. : 7,007,065 B2
APPLICATION NO. : 09/837341
DATED : February 28, 2006
INVENTOR(S) : Koichi Matsuda It is certified that error appears in the above-identified patent and that said Letters Patent is hereby corrected as shown below:

At column 9, line 21, change ""all"" to --"a"--.

Signed and Sealed this

Seventeenth Day of October, 2006

JON W. DUDAS
*Director of the United States Patent and Trademark Office*